United States Patent
Fong et al.

(10) Patent No.: US 7,178,478 B1
(45) Date of Patent: *Feb. 20, 2007

(54) INDICATOR ASSEMBLY WITH HALO-FREE POINTER

(75) Inventors: Ching Fong, Canton, MI (US); Kazuhiko Yamaguchi, Novi, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/262,992

(22) Filed: Oct. 31, 2005

Related U.S. Application Data

(63) Continuation-in-part of application No. 11/029,961, filed on Jan. 5, 2005, now Pat. No. 6,983,717.

(51) Int. Cl.
*G01D 11/28* (2006.01)

(52) U.S. Cl. .............. 116/288; 116/62.1; 116/DIG. 36; 362/29

(58) Field of Classification Search ................ 116/286, 116/287, 288, DIG. 5, DIG. 6, DIG. 36, 116/62.1, 62.4; 362/23, 26, 27, 29, 30, 253, 362/267, 489
See application file for complete search history.

(56) References Cited

U.S. PATENT DOCUMENTS

| | | | | |
|---|---|---|---|---|
| 2,663,107 A * | 12/1953 | Nassau et al. | ................. | 40/546 |
| 2,693,165 A * | 11/1954 | Appleman | ................... | 116/310 |
| 2,699,141 A * | 1/1955 | Gaguski | ..................... | 116/332 |
| 2,916,011 A | 12/1959 | Molis | | |
| 3,641,967 A * | 2/1972 | Charbonneaux | ............ | 116/288 |
| 4,800,466 A * | 1/1989 | Bauer et al. | .................. | 362/26 |
| 4,998,318 A * | 3/1991 | Nohtomi et al. | ............... | 16/441 |
| 5,093,764 A * | 3/1992 | Hasegawa et al. | ............ | 362/29 |
| 5,171,080 A | 12/1992 | Bathurst | | |
| 6,066,225 A * | 5/2000 | Lopes | ......................... | 156/245 |
| 6,161,934 A | 12/2000 | Griffin et al. | | |
| 6,302,055 B1 * | 10/2001 | Kalashnikov | ................ | 116/288 |
| 6,312,136 B1 | 11/2001 | Kalashnikov | | |
| 6,338,561 B1 | 1/2002 | Ikarashi | | |
| 6,595,667 B1 | 7/2003 | Obata | | |
| 6,626,549 B2 * | 9/2003 | Fujita et al. | ................... | 362/27 |
| 6,663,251 B2 | 12/2003 | Calvert | | |
| 6,667,446 B1 * | 12/2003 | Schuberth et al. | .............. | 200/4 |
| 6,983,717 B1 * | 1/2006 | Fong | ........................... | 116/288 |
| 2002/0002941 A1 | 1/2002 | Nakane | | |
| 2003/0112619 A1 | 6/2003 | Ewers et al. | | |

(Continued)

FOREIGN PATENT DOCUMENTS

JP 09043002 A * 2/1997

(Continued)

*Primary Examiner*—R. Alexander Smith
(74) *Attorney, Agent, or Firm*—Harness, Dickey & Pierce, P.L.C.

(57) ABSTRACT

An indicator assembly with a dial face, a pointer and a lamp. The dial face has an opaque portion and defines a shaft aperture. The pointer has a connecting portion, a pointer portion and an opaque boot portion. The connecting portion is disposed in-line with the aperture. The pointer portion is coupled to and extends radially outwardly from the connecting portion. The boot portion extends about the connecting portion and contacts the dial face in a zone that encircles the aperture. The lamp is disposed rearwardly of the dial face and provides a source of light. A method for reducing or eliminating a halo effect is also provided.

9 Claims, 2 Drawing Sheets

U.S. PATENT DOCUMENTS

2004/0145884 A1   7/2004   Orikasa

FOREIGN PATENT DOCUMENTS

| JP | 09133556 | A | * | 5/1997 |
| JP | 11211513 | A | * | 8/1999 |
| JP | 2000193497 | A | * | 7/2000 |
| JP | 2004053449 | A | * | 2/2004 |
| JP | 2004325434 | A | * | 11/2004 |

* cited by examiner

US 7,178,478 B1

INDICATOR ASSEMBLY WITH HALO-FREE POINTER

CROSS-REFERENCE TO RELATED APPLICATIONS

This application is a continuation-in-part of U.S. patent application Ser. No. 11/029,961, which was filed on Jan. 5, 2005 now U.S. Pat. No. 6,983,717.

INTRODUCTION

The present invention generally relates to illuminated indicator assemblies and more particularly to an illuminated indicator assembly wherein light leakage about the hub of a pointer is significantly reduced or eliminated altogether.

Illuminated indicator assemblies having a rotating pointer are known in the art. In such instruments, the pointer is driven by a shaft that extends through a hole in a display face or member. One drawback of the known illuminated indicator assembly arrangements concerns light leakage through the hole in the display face. More specifically, light leaking through the hole in the display face tends to illuminate the hub of the pointer which is known in the art as producing a "halo effect".

The halo effect is particularly problematic with non-black dial faces and in particular, dial faces with background colors that are relatively light in color such as white, cream or tan. Accordingly, it would be desirable to have an illuminated indicator assembly that significantly reduced or eliminated light leakage about the pointer.

SUMMARY

In one form, the present teachings provide an indicator assembly with a dial face, a pointer and a lamp. The dial face has an opaque portion and defines a shaft aperture. The pointer has a connecting portion, a pointer portion and an opaque boot portion. The connecting portion is disposed in-line with the aperture. The pointer portion is coupled to and extends radially outwardly from the connecting portion. The boot portion extends about the connecting portion and contacts the dial face in a zone that encircles the aperture. The lamp is disposed rearwardly of the dial face and provides a source of light.

In another form, the present teachings provide an indicator assembly with a display face, a pointer shaft, a pointer and a lamp. The display face includes an opaque portion with a shaft aperture formed therethrough. The pointer shaft extends through the shaft aperture. The pointer has a hub portion, a pointer portion and a boot portion. The hub portion is coupled to the pointer shaft and is disposed on a first side of the display face. The pointer portion extends radially outwardly hub portion. The boot portion is formed of an opaque material and is coupled to the hub portion so as to contact the first side of the display face in a zone that encircles the shaft aperture. The lamp is disposed rearwardly of the display face and provides a source of light In yet another form, the present teachings provide a method for reducing or eliminating a halo effect. The method includes: providing a display face having an opaque portion with a shaft aperture formed therethrough; providing a pointer with a hub portion and a boot portion, the boot portion being coupled to the hub portion and being formed of an opaque material; aligning a pointer to the shaft aperture such that the boot portion contacts the display face in a zone encircling the shaft aperture; and illuminating a lamp on a side of the display face opposite the boot portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
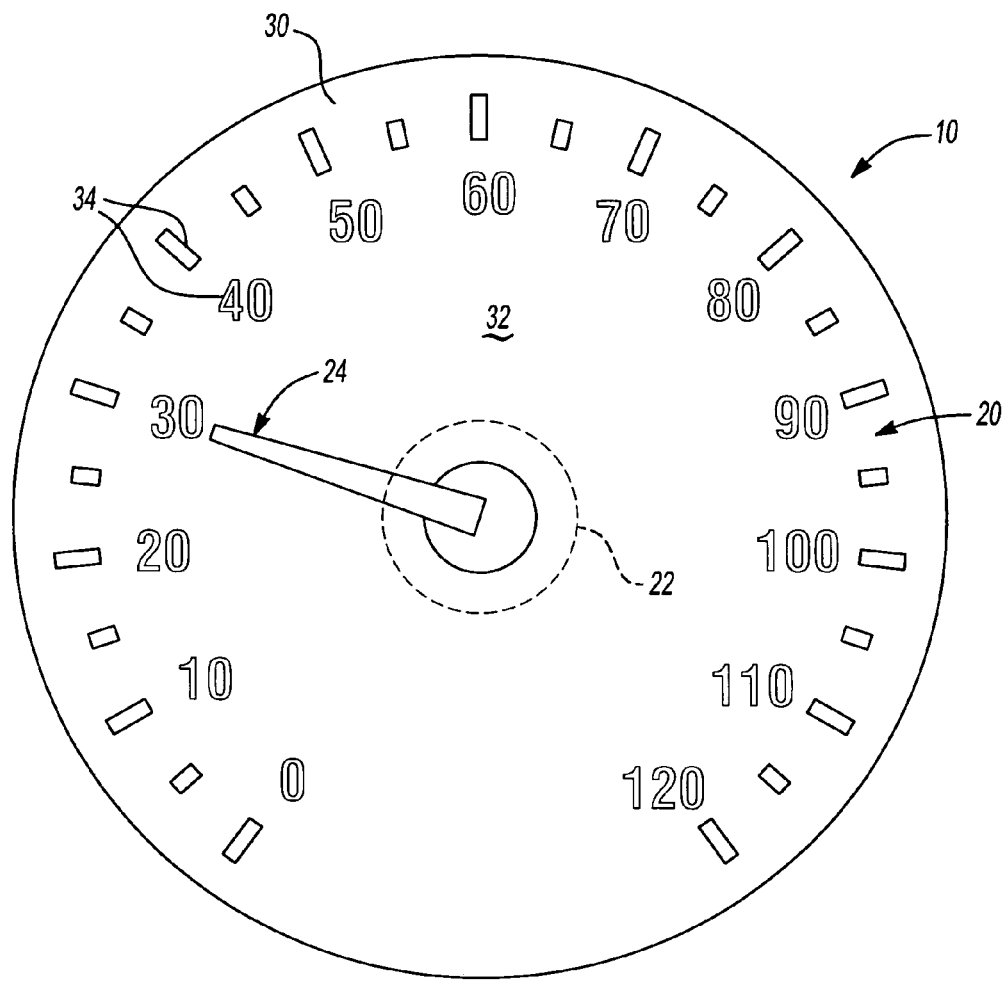
FIG. 1 is a front view of an automotive indicator assembly constructed in accordance with the teachings of the present invention.
Figure 2:
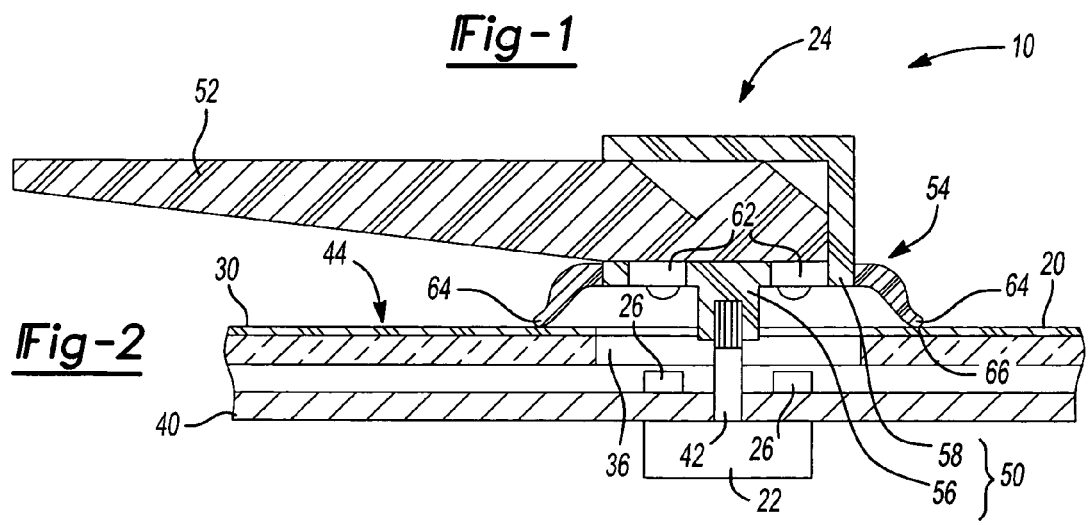
FIG. 2 is a sectional view of the indicator assembly of FIG. 1 taken along a longitudinal axis of the pointer.

With reference to FIGS. 1 and 2 of the drawings, an indicator assembly constructed in accordance with the teachings of the present invention is generally indicated by reference numeral 10. The indicator assembly 10 can generally include a dial 20, a drive unit 22, a pointer 24 and a lamp 26. While the indicator assembly 10 is illustrated as being a speedometer, it will be appreciated that the teachings of the present invention have applicability to various other types of instruments, whether automotive or not, and as such, the particular example illustrated is not intended to be limiting in any way.

The dial 20 can include a dial face 30 with an opaque portion or background 32 and dial face indicia 34, which may be translucent. The background 32 can have any coloration, including a non-black color such as white, cream, tan or another relatively light color. A shaft aperture 36 can be formed through the background 32.

The drive unit 22 can include a motor, such as a stepper motor, and may be mounted in a manner that is conventional and well known in the art, such as to a printed circuit board 40. The drive unit 22 is mounted rearwardly of the dial face 30 and includes a rotatable output shaft 42 that is disposed in-line with the shaft aperture 36. While the output shaft 42 is illustrated as extending forwardly of a forward surface 44 of the dial face 30, it will be appreciated that the output shaft 42 may be formed otherwise depending upon the configuration of the pointer 24.

The pointer 24 can include a connection portion 50, a pointer portion 52 and an opaque boot portion 54. The connection portion 50 can include a hub 56 and a cover 58. The hub 56 can extend through the shaft aperture 36 in the dial face 30 and can be coupled for rotation with the output shaft 42. The hub 56 can include one or more light transmitting windows 62 that will be discussed in greater detail, below. The cover 58 can be a discrete component that can be formed of an opaque material and fixedly coupled to the hub 56 in a suitable process, such as bonding or heat staking.

The pointer portion 52 is can be coupled to the hub 56 to thereby rotate therewith and can be formed of a transparent or translucent material. The pointer portion 52 can extend radially outwardly from the hub 56 and can terminate proximate the dial face indicia 34.

Figure 3:
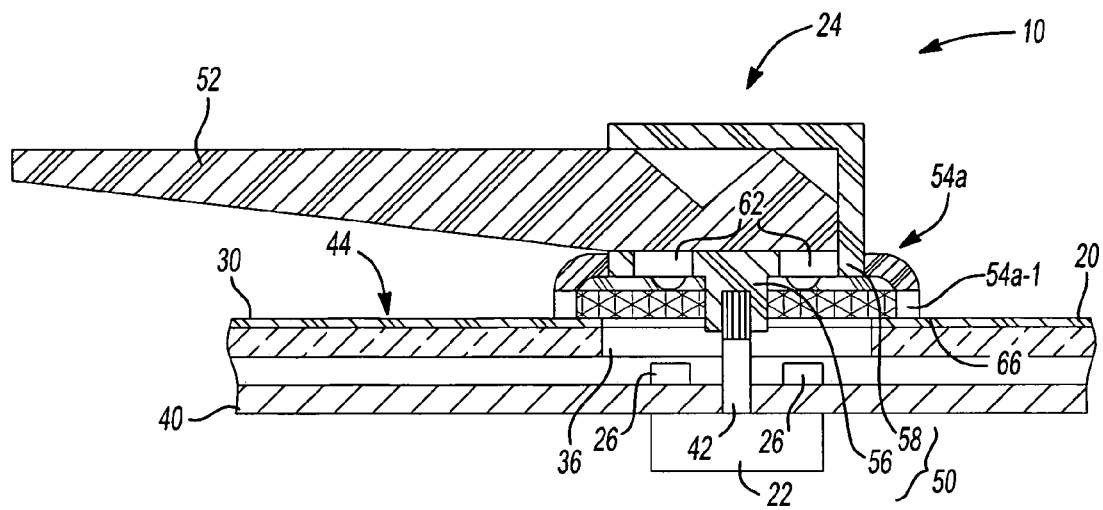
FIG. 3 is a sectional view similar to that of FIG. 2 but illustrating a portion of a second automotive indicator assembly constructed in accordance with the teachings of the present invention.
Figure 4:
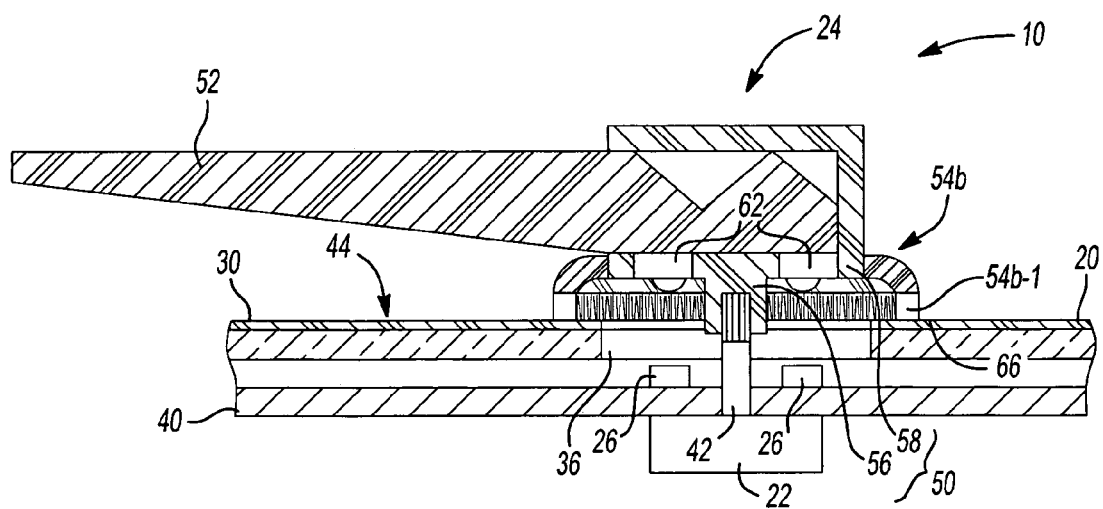
FIG. 4 is a sectional view similar to that of FIG. 2 but illustrating a portion of a third automotive indicator assembly constructed in accordance with the teachings of the present invention.

The boot portion 54 can be formed of a resilient opaque material, such as an elastomer or a thermoplastic elastomer. It will be appreciated that any opaque material that is soft, resilient and/or relatively slick could be employed to fabricate the boot portion 54 in whole or in part. Further suitable materials include textiles, which may be natural materials such as silk, felt or cotton or man-made fabrics or threads such as polyester; bristles (e.g., soft nylon, natural hair); and materials such as polytetrafluoroethylene (PTFE) and perfluoroalkoxy polymer resin (PFA). FIG. 3 illustrates an embodiment wherein the boot portion 54*a* is partially formed of a textile 54*a*-1 and FIG. 4 illustrates an embodiment wherein the boot portion 54*b* is partially formed of bristles 54*b*-1. Returning to FIGS. 1 and 2, the boot portion 54 can be a discrete component that is coupled to the connection portion 50 or can be formed onto the connection portion 50 in a suitable process, such as overmolding. The boot portion 54 can include an edge or lip 64 that contacts the dial face 30 in a zone 66 that is disposed about the shaft aperture 36 in the dial face 30.

The lamp 26 can include one or more incandescent lamps or LEDs that may be mounted in a manner that is conventional and well known in the art, such as to the printed circuit board 40. The lamp 26 can be configured to illuminate the dial face indicia 34 and/or the pointer 24 in a manner that is well known in the art. Briefly, where the dial face indicia 34 is to be illuminated, a light guide (not specifically shown) may be employed to direct light about a rearward surface of the dial 20 to back-illuminate the dial face indicia 34. As the pointer 24 is to be illuminated in the example provided, light generated by the lamp 26 can be transmitted through the light transmitting windows 62 of the hub 56 and into the pointer portion 52. As the cover 58 is opaque, light traveling through the pointer 24 appears to only illuminate the pointer portion 52.

Light generated by the lamp 26 may "leak" through the dial face 30 in the space between the output shaft 42 and the edge of the shaft aperture 36. Significantly, contact between the opaque boot portion 54 and the dial face 30 prevents any light that "leaks" through the dial face 30 from being viewed from the front of the indicator assembly 10 and thereby effectively eliminates the above-noted "halo effect".

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An indicator assembly comprising:
   a dial having a dial face, the dial face having an opaque portion with an aperture formed therethrough;
   a pointer with a connecting portion, a pointer portion and an opaque boot portion, the connecting portion being disposed in-line with the aperture, the pointer portion being coupled to and extending radially outwardly from the connecting portion, the boot portion extending about the connecting portion and contacting the dial face in a zone that encircles the aperture; and
   a lamp that is disposed rearwardly of the dial face, the lamp providing a source of light;
   wherein the boot portion is at least partially formed of at least one material selected from a group consisting of textiles, bristles, polytetrafluoroethylene and perfluoroalkoxy polymer resin.

2. The indicator assembly of claim 1, wherein the pointer portion is formed of a translucent material and at least a portion of the light produced by the lamp is received by the pointer portion to illuminate the pointer portion.

3. The indicator assembly of claim 1, wherein the dial face has a viewing surface, the viewing surface having a background, the background being a color other than black.

4. An indicator assembly comprising:
   a display face having an opaque portion with a shaft aperture formed therethrough;
   a pointer shaft extending through the shaft aperture;
   a pointer having a hub portion, a pointer portion and a boot portion, the hub portion being coupled to the pointer shaft and being disposed on a first side of the display face, the pointer portion extending radially outwardly from the hub portion, the boot portion being formed of an opaque material, the boot portion being coupled to the hub portion and contacting the first side of the display face in a zone that encircles the shaft aperture; and
   a lamp that is disposed rearwardly of the display face, the lamp providing a source of light;
   wherein the boot portion is at least partially formed of at least one material selected from a group consisting of textiles, bristles, polytetrafluoroethylene and perfluoroalkoxy polymer resin.

5. The indicator assembly of claim 4, wherein the pointer portion is formed of a translucent material and at least a portion of the light produced by the lamp is received by the pointer portion to illuminate the pointer portion.

6. The indicator assembly of claim 4, wherein the display face has a viewing surface, the viewing surface having a background, the background being a color other than black.

7. A method comprising:
   providing a display face having an opaque portion with a shaft aperture formed therethrough;
   providing a pointer with a hub portion and a boot portion, the boot portion being coupled to the hub portion and being formed of at least one opaque material selected from a group consisting of textiles, bristles, polytetrafluoroethylene and perfluoroalkoxy polymer resin;
   aligning a pointer to the shaft aperture such that the boot portion contacts the display face in a zone encircling the shaft aperture; and
   illuminating a lamp on a side of the display face opposite the boot portion.

8. The method of claim 7, wherein illumination of the lamp illuminates a portion of the display face.

9. The method of claim 8, wherein illumination of the lamp illuminates a portion of the pointer.

* * * * *